(12) United States Patent
Meyers (10) Patent No.: US 6,907,568 B1
(45) Date of Patent: Jun. 14, 2005

(54) TANGIBLE ICON REPRESENTING NETWORK OBJECTS

(75) Inventor: Stephan Meyers, Los Angeles, CA (US)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 09/828,763

(22) Filed: Apr. 9, 2001

(51) Int. Cl.⁷ ................................................ G09G 5/00
(52) U.S. Cl. .................... 715/700; 715/741; 715/866
(58) Field of Search ................... 715/700, 733, 715/741, 744, 764, 866; 709/217, 219; 705/64, 65, 66, 67; 345/156, 700, 733, 741, 744, 764, 866

(56) References Cited

U.S. PATENT DOCUMENTS

| | | | |
|---|---|---|---|
| 5,978,773 A | | 11/1999 | Hudetz et al. |
| 5,992,752 A | * | 11/1999 | Wilz et al. ............. 235/472.01 |
| 6,058,304 A | | 5/2000 | Callaghan et al. |
| 6,314,457 B1 | | 11/2001 | Schena et al. |
| 6,448,979 B1 | | 9/2002 | Schena et al. |
| 6,542,927 B2 | * | 4/2003 | Rhoads ....................... 709/217 |
| 6,681,028 B2 | * | 1/2004 | Rodriguez et al. .......... 382/100 |
| 6,694,043 B2 | * | 2/2004 | Seder et al. ................. 382/100 |
| 6,701,354 B1 | * | 3/2004 | Philyaw et al. ............. 709/219 |

FOREIGN PATENT DOCUMENTS

| | | |
|---|---|---|
| EP | 0645728 B1 | 10/2002 |
| WO | WO 93/07566 | 4/1993 |
| WO | WO 97/01137 | 1/1997 |
| WO | WO 99/17230 | 4/1999 |

\* cited by examiner

*Primary Examiner*—John Cabeca
(74) *Attorney, Agent, or Firm*—Cohen, Pontani, Lieberman & Pavane (57) ABSTRACT

A tangible icon is permanently encoded with a URL of a first network object. Links ("shortcuts") to other network objects are assigned as the contents of the first network object. A person in possession of the tangible icon can gain access to the other network objects without having to remember or enter their URLs, but need only present the physical icon to a reader. The system and method uses the URI encoded on the tangible icon to access the network object and to resolve the links contained therein to provide the contents of the linked objects. The number and size of the other network objects the user can access are virtually unlimited. The user gains access to the current version of an object.

22 Claims, 10 Drawing Sheets

TANGIBLE ICON REPRESENTING NETWORK OBJECTS

BACKGROUND OF THE INVENTION

1. Field of the Invention

The present invention relates to a tangible user interface, and particularly to a system and method for providing a user, by means of a tangible icon, with access to provider-selected arbitrary-sized objects on a data network.

2. Description of the Related Art

The present-day paradigm in which a person uses a discrete manifestation of "a computer" (workstation, desktop computer, laptop computer, palmtop computer, personal data assistant, game player, etc.) to relate to computation is beginning to give way to "pervasive computation", in which computation becomes part of the environment. See W. Mark, *Turning Pervazive Computing into Mediated Spaces*, IBM Systems Journal, Vol. 38, No. 4, 1999. The emerging relationship between people and pervasive computation is sometimes idealized as "smart space": the seamless integration of people, computation, and physical reality.

In the present-day paradigm, there is a marked distinction between times when one is "on the computer" and times when one is not. When computation is part of the environment, it will be part of everyday physical space. Computation will be embodied in things that people ordinarily use, not in "computers". The "Internet-ready" mobile phone is an example of this migration. Users will become far less conscious of using computation.

Changes in the present-day paradigm are already changing the approach to computation "on the computer". The paradigm is shifting away from the form it had in the early years of the popularity of the PC (personal computer, which was introduced in 1982) when almost every PC was free-standing and independent of all other PCs, and maintained its own program and data storage. Each computer had to be equipped with a device which could read removable media, such as a floppy disk drive. For a user of a computer to have access to programs or large data files, copies of them had to be read in to that particular computer from removable media. Programs and data files are known generally and collectively by the name "objects". An object may be generally defined as an information unit that can be individually selected and manipulated.

Now computers tend to be interconnected by networks, most notably the Internet, and to avail themselves of centralized network storage. For a user to have access to an object stored on the network, he must know and enter a universal resource locator (URL) for that object. As more and more everyday items are being stored on networks (e.g., central files of audio recordings replacing individuals' record collections) and as computing moves off of "computers" and becomes more and more distributed to users' different equipments (e.g., a music player connected to a network) which makes thinking in terms of a URL more and more abstract, and as the proliferation of stored objects requires keeping track of more and more URLs, a need arises for a way to enable a user to easily gain access to objects stored on networks.

A prior-art method to provide a user with easy access to an object is to give the user a copy of the object on some portable medium, such as a floppy disk or CD. This frees the user from having to navigate a network, but since a portable medium has an inherent maximum capacity for data, the size of an object that can be given to a user in this manner is inherently limited. According to current trends, larger and larger objects are coming into common use. For example, an audio-video presentation may have a storage size on the order of Gigabytes. It may be desired to provide a user with easy access to such a presentation, but the method of providing it on a removable medium is inherently precluded.

While the graphical user interface (GUI), which enables a user to interact with a computer by manipulating graphical icons, has gone a long way to make computation easier for non-engineers, it still represents a level of abstraction that will become increasingly burdensome as computation becomes more distributed. More recent is the concept of the tangible user interface (TUI) in which tangible, physical icons ("phicons") are manipulated to interact with a computer. A need arises for phicons that enable a user to easily gain access to objects stored on networks, and to easily gain access to objects of arbitrary size.

SUMMARY OF THE INVENTION

To overcome limitations in the prior art described above, and to overcome other limitations that will become apparent upon reading and understanding the present specification, the present invention provides for physical icons each of which is permanently encoded with an identification of a unique object on a network server. A user wishing to provide a recipient with easy access to selected network objects runs software which uses a reader to read a unique identification from a physical icon, prompts the user to select the objects to be provided to the recipient, and contacts the corresponding object on the network server, instructing it to insert links to the user-selected object into the network object identified by the physical icon. The provider then transfers possession of the physical icon to the recipient, who runs software which uses a reader to read the identification from the physical icon and which accesses the corresponding network object, instructing the network server to resolve the links contained in the network object, thus providing the contents of the selected files to the recipient.

One aspect of the invention is a method of providing access to objects on a computer network, the method comprising the steps of: a) maintaining on the computer network a plurality of first addresses; b) recording on at least one physical icon a unique one of the first addresses; c) reading a certain first address from a certain physical icon; d) linking a destination address of an arbitrary-sized object with the certain first address; and e) providing access to the arbitrary-sized object identified by the destination address.

Another aspect of the invention, a system for providing access to objects on a computer network, comprises: a plurality of physical icons, each bearing a unique machine-readable first URL identifying a first object; a network server for providing access to the first objects identified by the first URLs on the physical icons; a first data appliance configured to read a first URL from a certain physical icon, forward the first URL to the network server, and forward to the network server a second URL of a second object specified by a user of the first data appliance; the network server being configured to receive the second URL, and to insert into the first object a link to the second object; a second data appliance configured to read the first URL from the certain physical icon, forward the first URL to the network server, and to receive the second object obtained by resolving the link in the first object.

Another aspect of the invention provides a method of providing access to objects on a computer network, comprising the steps of: a) maintaining on the computer network a plurality of first addresses, each indicating a certain first object; b) machine-reading a certain first address from a certain physical icon of a plurality of physical icons, each physical icon containing one of the first addresses; c) accessing a certain first object identified by the certain first address and presenting on a user interface a representation of the certain first object; d) storing in the first object a second address identifying an arbitrary-size object selected in response to manipulation on the user interface; and e) subsequently accessing the arbitrary-sized object according to the second address.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should further understood that the drawings are not necessarily drawn to scale and that, unless otherwise indicated, they are merely intended to conceptually illustrate the structures and procedures described herein.

DESCRIPTION OF THE DRAWINGS

In the drawings, wherein like reference numerals denote similar elements.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practices. Its is to be understood that other embodiments may be utilized and structural and functional modifications may be made without departing from the scope of the present invention.

Figure 1:
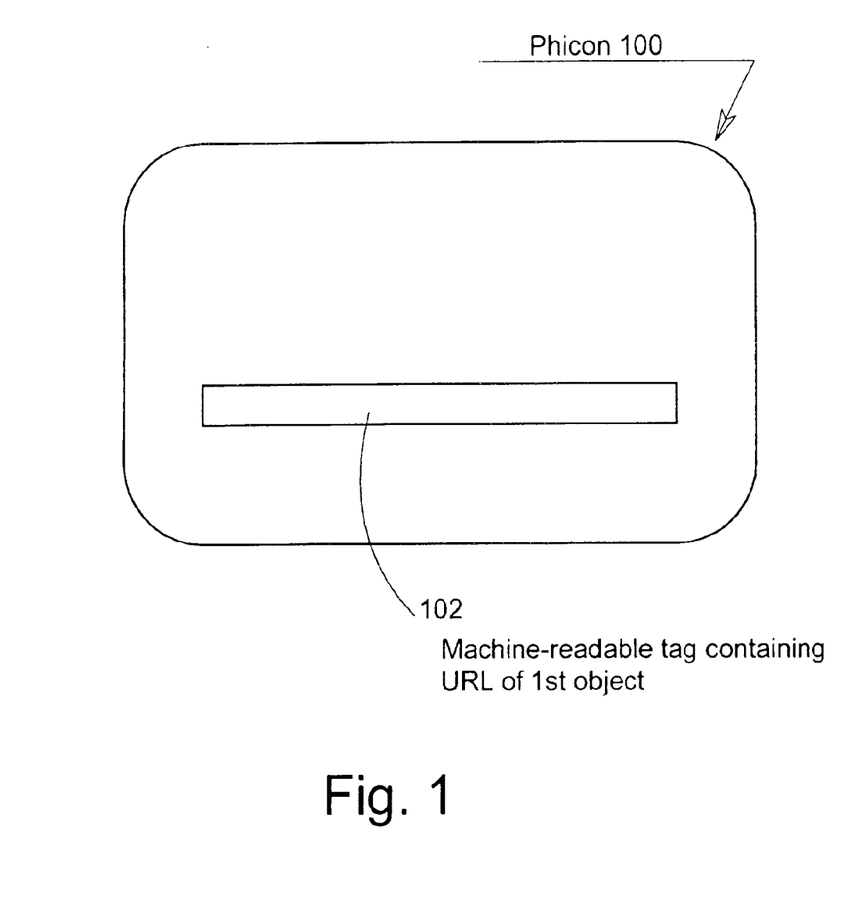
FIG. 1 depicts a phicon according to one embodiment of the present invention.

In accordance with one embodiment of the present invention, FIG. 1 depicts phicon (derived from "physical icon") 100 for use in the present invention. Phicon 100 is about the size of a credit card for convenient carrying and manipulation by a user, and is made of plastic similar to the material typically used for credit cards. Phicon 100 includes machine readable tag 102 containing a destination address of a network object. In the Internet environment, a destination address is known as a URL. A preferred embodiment of the invention is practiced in an Internet setting, and the term "URL" is used herein. When a phicon 100 is inserted in a phicon reader to be discussed, the URL of the network object is read from tag 102. The encoding of the URL on tag 102 may be any form of machine-readable encoding, such as an RF patch antenna, OCR or MICR characters, bar code, magnetic stripe, printed circuit, etc.

Figure 2:
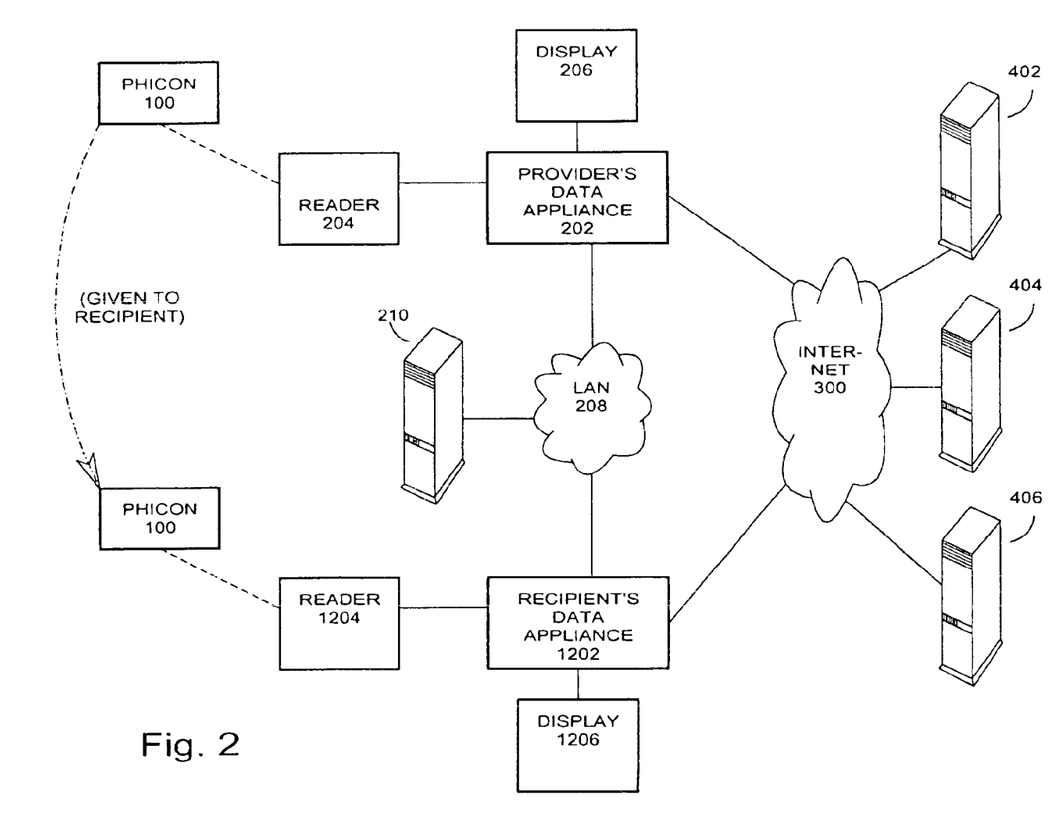
FIG. 2 is a block diagram of a system according to one embodiment of the present invention, and on which a method of the present invention may be practiced.

According to one embodiment of the present invention, FIG. 2 is a high-level block diagram of a system in which the present invention may be practiced. FIG. 2 is primarily directed toward the situation where a first party (here called "the provider") wishes to provide easy access to network objects of arbitrary size to a second party (here called "the recipient"), but those skilled in the art will appreciate that FIG. 2 can be adapted to a situation where the provider and the recipient are the same party; e.g., a user wishes to set up subsequent easy access for himself to certain network objects.

The provider and recipient have "data appliances" 202 and 1202 respectively. The term "data appliance" is used here to connote an apparatus with sufficient intelligence to transfer data to or from a network, and to perform some useful operation on the data. For example, it may be a present-day PC, or it may be a music player that can access MPEG (Motion Pictures Expert Group) or MP3 files from a network and play the music coded therein.

The present invention makes particular use of phicon 100. The inventive system includes companion readers 204 and 1204 which can read the data from a phicon 100 when it is presented to them and which pass the data to data appliance 202 or 1202 respectively. Each phicon is encoded with a unique URL. In the preferred embodiment uniqueness is accomplished by giving each phicon a unique serial-number portion. For example, a batch of two-thousand phicons to be used with reference to a local-area network (LAN) at ABC Corporation might be encoded with URLs http://card.abccorp.con/cardid.asp?0000001 through http://card.abccorp.comicardid.asp?0002000

The unique URL on the phicon 100 represents a unique network object; in the present example, that object may exist on the server whose domain name is card.abccorp.com. That object does not necessarily exist prior to the use of a phicon identifying it; it may be brought into existence at the time a corresponding phicon is used. The URLs of other objects may be stored in the object corresponding to the phicon. Subsequent uses of the phicon may then find those URLs of other objects and link to them through the object corresponding to the phicon. The user may insert the phicon into a phicon reader located on a wired network terminal, or located on a device wirelessly connected to the network, or in wireless communication with a network terminal such as through a Bluetooth connection.

It will now be supposed that a provider wishes to use one of these phicons to provide a recipient with easy access to a Lotus-123 spreadsheet file named SS.123 located on server 210 (connected via LAN 208), and with easy access to a multi-media presentation file named MM.HTM located on server 402, accessible via the Internet 300. The provider takes a phicon and presents it to reader 204, which forwards the URL encoded on the phicon 100 to data appliance 202. The domain name portion of the URL must refer to a domain accessible to data appliance 202. For the example of FIG. 2, it is supposed that the domain name "card.abccorp.com" corresponds to ABC Corporation's card server, which in the present example is server 404 on FIG. 2. Software running on provider's data appliance 202 forwards the URL to server 404, and in response to the complete URL, server 404 generates a network object corresponding to the URL, if such an object does not already exist. (Prior to the first use of a particular phicon, there is no overt reason for a corresponding network object to exist.)

Provider's data appliance 202 then causes a graphical icon (not shown in FIG. 2) to appear on display 206. In a preferred embodiment the graphical icon is an image of a virtual floppy disk drive. Using conventional file management software which permits manipulation of graphical icons, the provider selects the files she wishes to provide to the recipient (in this example, SS.123 on server 210 and MM.HTM on server 402) and "drags" their icons into the icon of the virtual floppy disk drive. In response to these actions, server 404 inserts links ("shortcuts") into the object it created in response to the URL coded on the phicon 100.

The phicon 100 may now be given to the recipient. The provider might hand-write identifying material on the face of the phicon 100—for example, "Spreadsheet and Multi-Media presentation for Harry". The recipient presents the phicon 100 to his reader 1204 which reads the encoded URL and passes it to data appliance 1202 which in turn requests opening of the object identified by the encoded URL. In the present example, this is the aforementioned object on server 404. On his display 1206, the recipient sees, in a conventional file-management presentation, representations of SS.123 and MM.HTM, either of which he can open and view or execute.

This example presupposes that the recipient has access to LAN 208 (i.e., that he is in the same company as the provider) and that he has access to servers 404 and 402. Even if the recipient has a physical connection to LAN 208, security criteria (e.g., imposed in the form of password-based access rights) apply as usual on LAN 208 and on servers 404 and 402. If the recipient would normally be precluded from accessing objects on server 404 or from viewing SS.123 and MM.HTM, possession of the phicon does not override that.

No new information was recorded on the phicon 100 to enable the recipient to have easy access to SS.123 and MM.HTM. When the recipient is finished with the information provided to him, he could reuse the same phicon to provide other information to yet another recipient. He would run provider software on His data appliance, delete SS.123 and MM.HTM from the virtual floppy disk drive presented to him to represent the aforementioned object on server 404, and "drag" representations of other files he wishes to provide, thus creating links to them in the aforementioned object on server 404.

The example above has presupposed that the providers and recipients are all affiliated with ABC Corporation, but general public use of the inventive system could be enabled by a company undertaking to maintain a public card server. For example, a company called CardCo might maintain a server (406 on FIG. 2) with a domain name of cardco.com. Such a company would then mass-market phicons, each coded with a unique UTRL comprising a domain-name portion identifying server 406 and a unique serial-number portion. Anyone could then use provider software to create an object on server 406 corresponding to a particular phicon and containing links to other selected objects. That phicon could then be used by a recipient to easily access those objects (again, presuming that security qualifications are met). As noted, the "recipient" might be the same person who functioned as the "provider" in preparing the phicon. For example, a user might wish to prepare a network object that enables him to subsequently view a stored copy of the movie Birth of a Nation simply by presenting to his phicon reader the phicon he used when he prepared the network object and on which he has handwritten "Birth of a Nation", freeing him from having to remember and enter a probably lengthy and arcane URL connoting the network location of the stored copy, or from having to use file-management software to locate the copy each time he wishes to view it. CardCo might defray its expenses and garner profit from various sources including the sale of the phicons and revenue from advertisers for ads presented to users of server 406 or from ads printed on the phicons.

It is inherent in the inventive scheme that a phicon 100 indirectly addresses network objects. Thus the objects, as well as access rights to the objects, may change after deployment of a phicon 100. For example, in the foregoing example where a recipient was given a phicon 100 to access a spreadsheet file named SS.123, changes may be made to SS.123 and each use by the recipient of the phicon 100 will result in his seeing the then-current version of SS.123, not the version that was current at the time of deploying the phicon 100. Similarly, if a user's access rights or an object's access attributes change so that a recipient is no longer permitted access to the object, his mere possession of the phicon 100 will not override his being denied access to the object. Further, if SS.123 should be deleted, the object referenced by phicon 100 still appears to contain a link to SS.123, but that link will turn out to be unresolvable.

A recipient of a phicon 100 does not necessarily have to retain the phicon 100 in order to retain easy access to the objects it links to. The recipient may simply copy the URL from the phicon 100 and retain that copy, for example by copying the URL into a "bookrnark" using the bookmark feature provided in popular web browsers.

In cases where it is desired to mass-distribute access to a network object, a large number of phicons 100 may be produced that all contain the same URL. For example, in an advertising promotion, phicons may be distributed as "fly sheets" inserted in magazines, all bearing printed indications of what the offer is, and all bearing the same coded URL leading to a network object that contains a link to an object giving details of the offer.

Also, phicons distributed as fly sheets in a particular issue of a particular magazine may all be encoded with a URL uniquely associated with the magazine's title and issue number, and pointing to a link to details of an offer, and perhaps eliciting user response to the offer, such as making a purchase. This would aid advertisers in identifying magazines in which advertising of their products or services is most productive. The rate charged by magazines for carrying the phicons may be a function of the number of inquiries made, using the phicons, by prospective customers.

Further, the phicons may be coded in such a way as to identify customer demographics (as by identifying a URL associated with a particular outlet to which the magazine will be shipped for final sale). Or, in the case of magazines sent directly to the customer under a subscription, the included phicons may identify the customer, as by being encoded with a URL uniquely associated with the customer (e.g., by a serial number assigned to each customer) and pointing to a link to the offer. For simplicity, encoding of the phicon could be performed in the same process in which the magazine is addressed.

When an advertiser makes an introductory or promotional offer the fulfillment of which may actually incur a loss, it can be advantageous to code each phicon with a unique URL, thus guarding against misuse such as multiple acceptances of the offer by a single party.

Figure 3A:
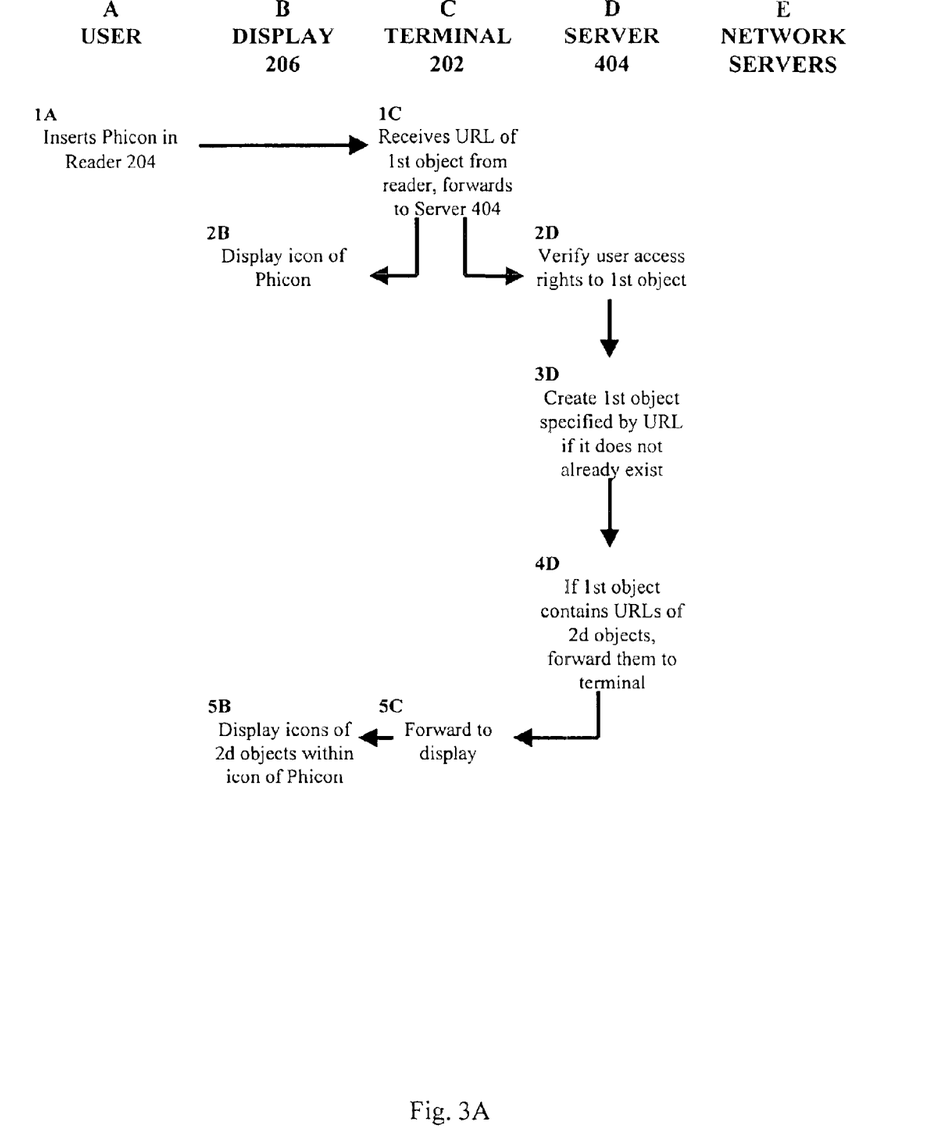
FIGS. 3A through 3D depict functional flow through units depicted in FIG. 2.
Figure 3B:
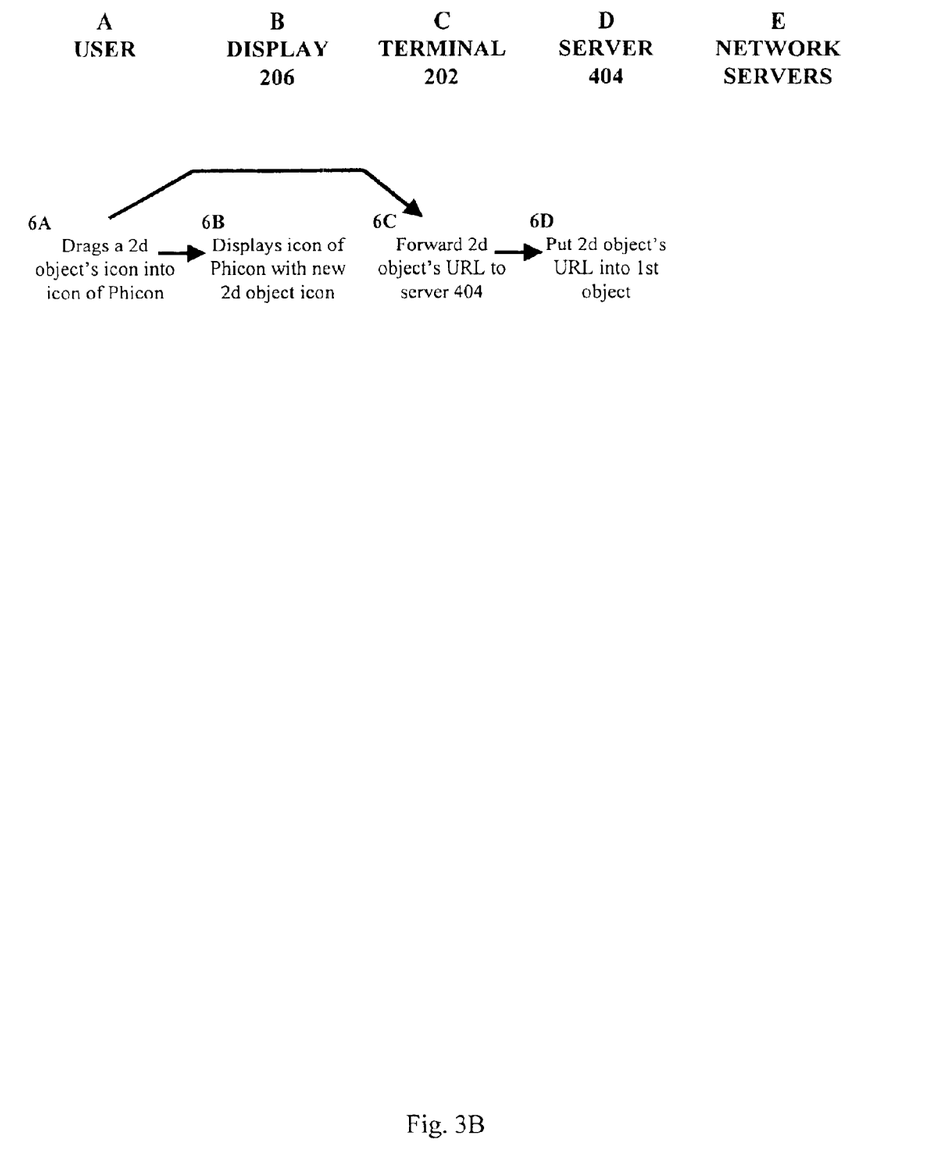
Figure 3C:
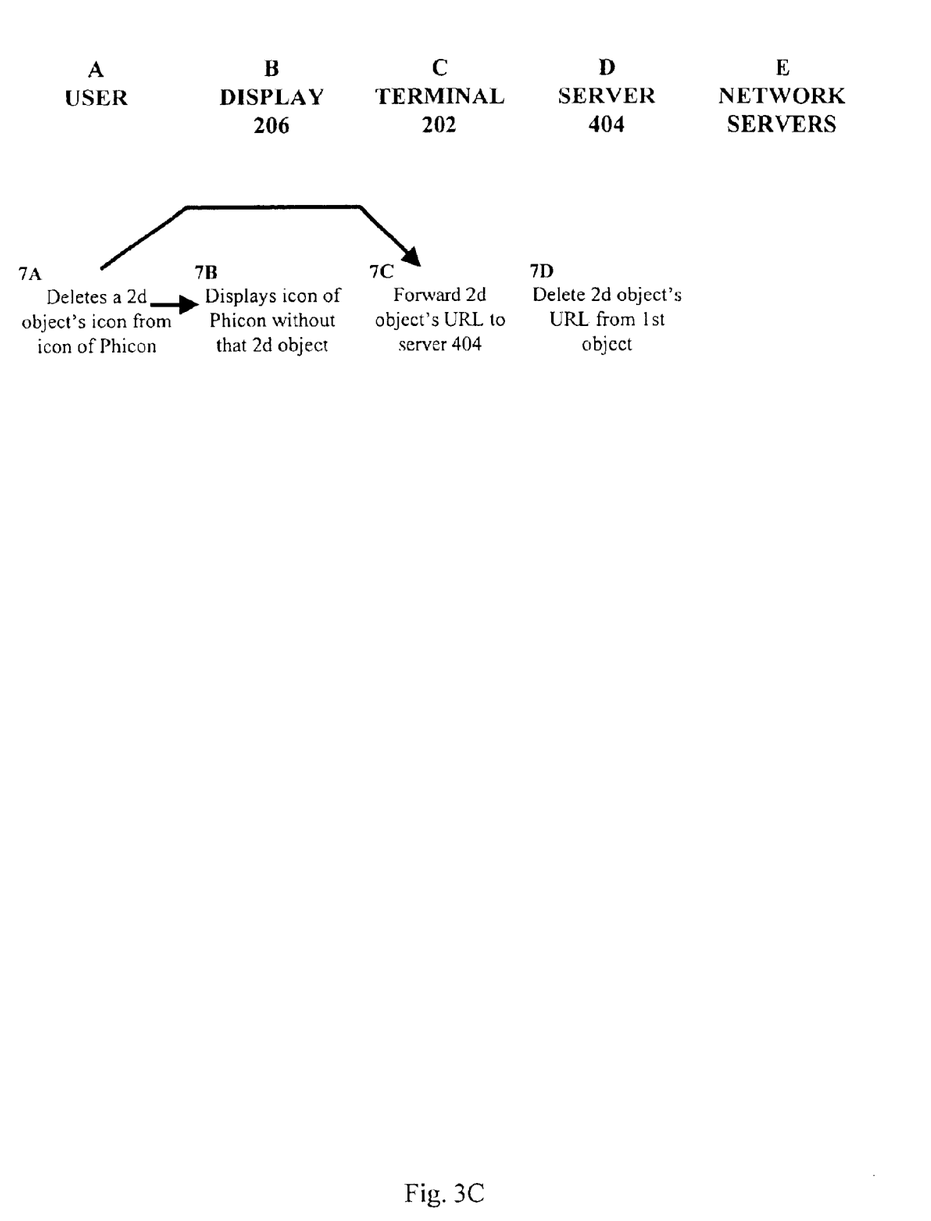
Figure 3D:
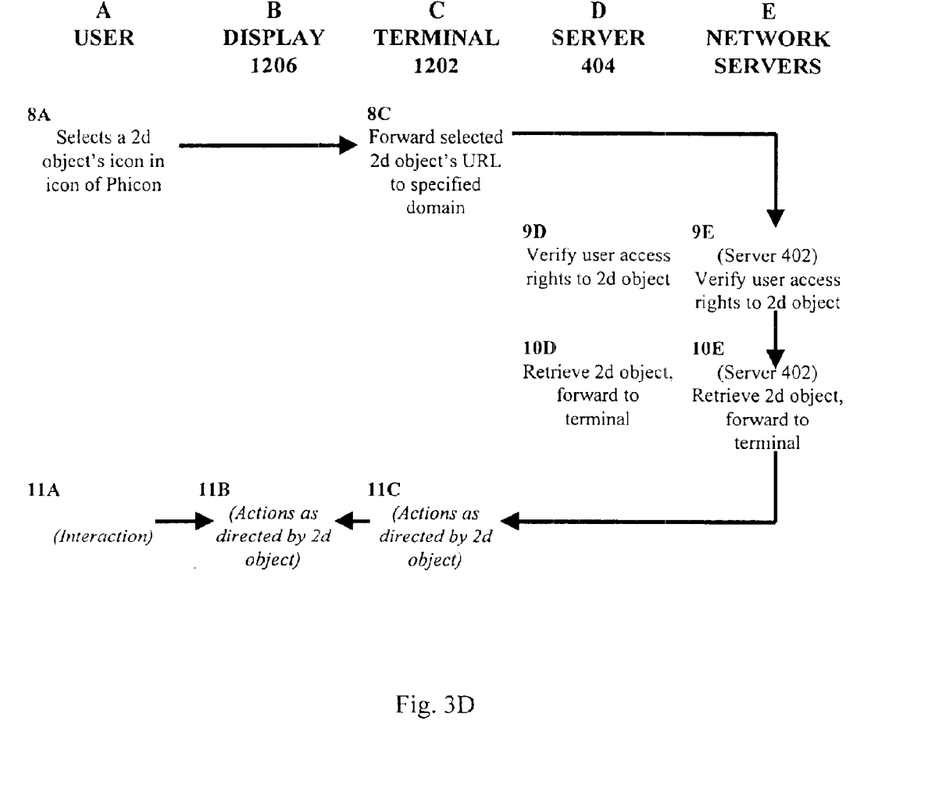
Figure 4A:
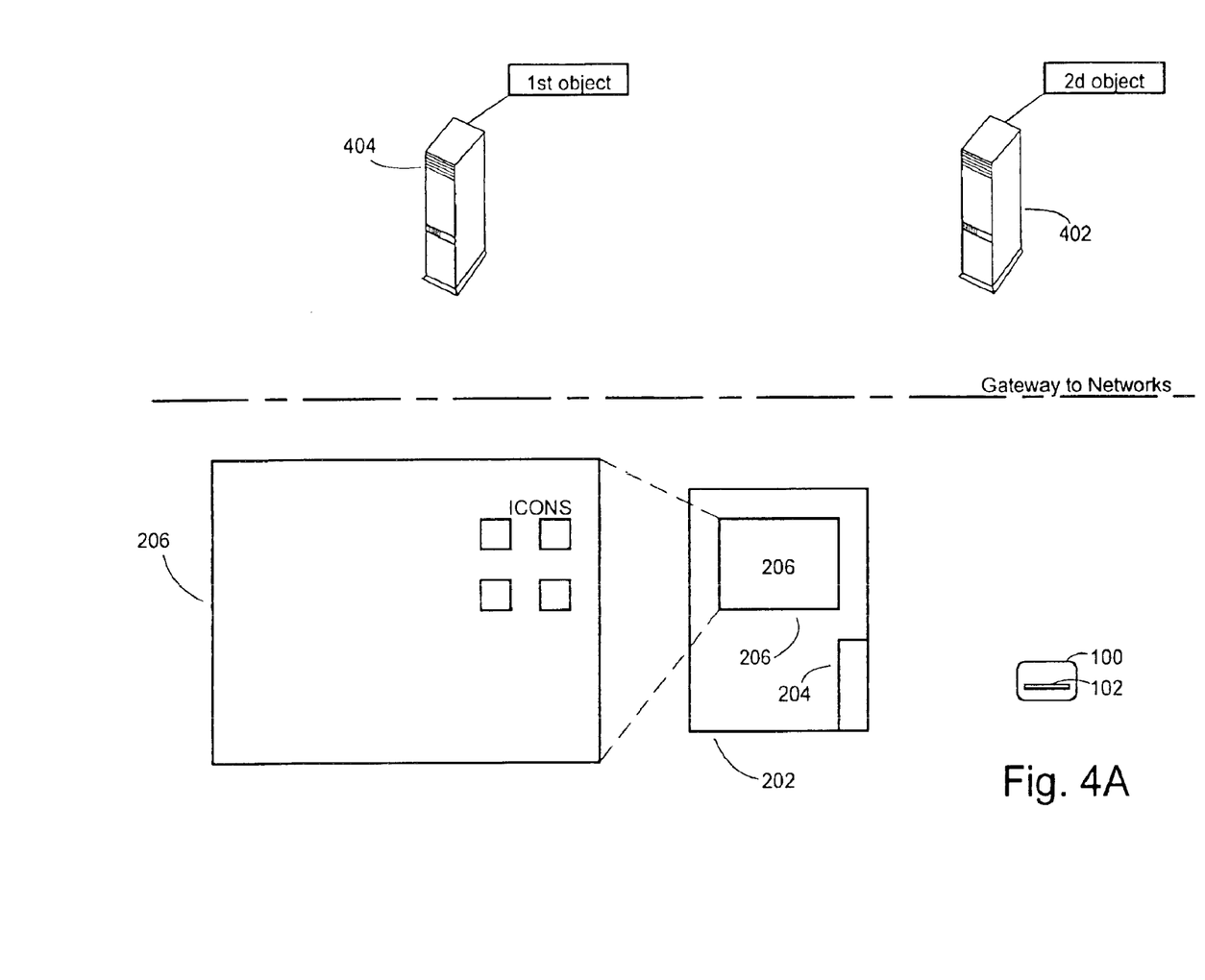
FIGS. 4A through 4D correlate the flow of FIGS. 3A through 3d with units of FIG. 2.

According to one embodiment of the present invention, FIGS. 3A through 3D show detail of a functional flow through some of the units depicted in FIG. 2, and FIGS. 4A through 4D correlate the details given in FIGS. 3A through 3D with some of the units depicted in FIG. 2. FIG. 4A illustrates a phicon 100 with a machine-readable tag 102, a user data appliance terminal 202 with phicon reader 204 and display 206, and network servers 402 and 404. In this example, display 206 already displays icons representing network objects. This is the result of actions by the user prior to the inception of the present exemplary scenario.

Figure 4B:
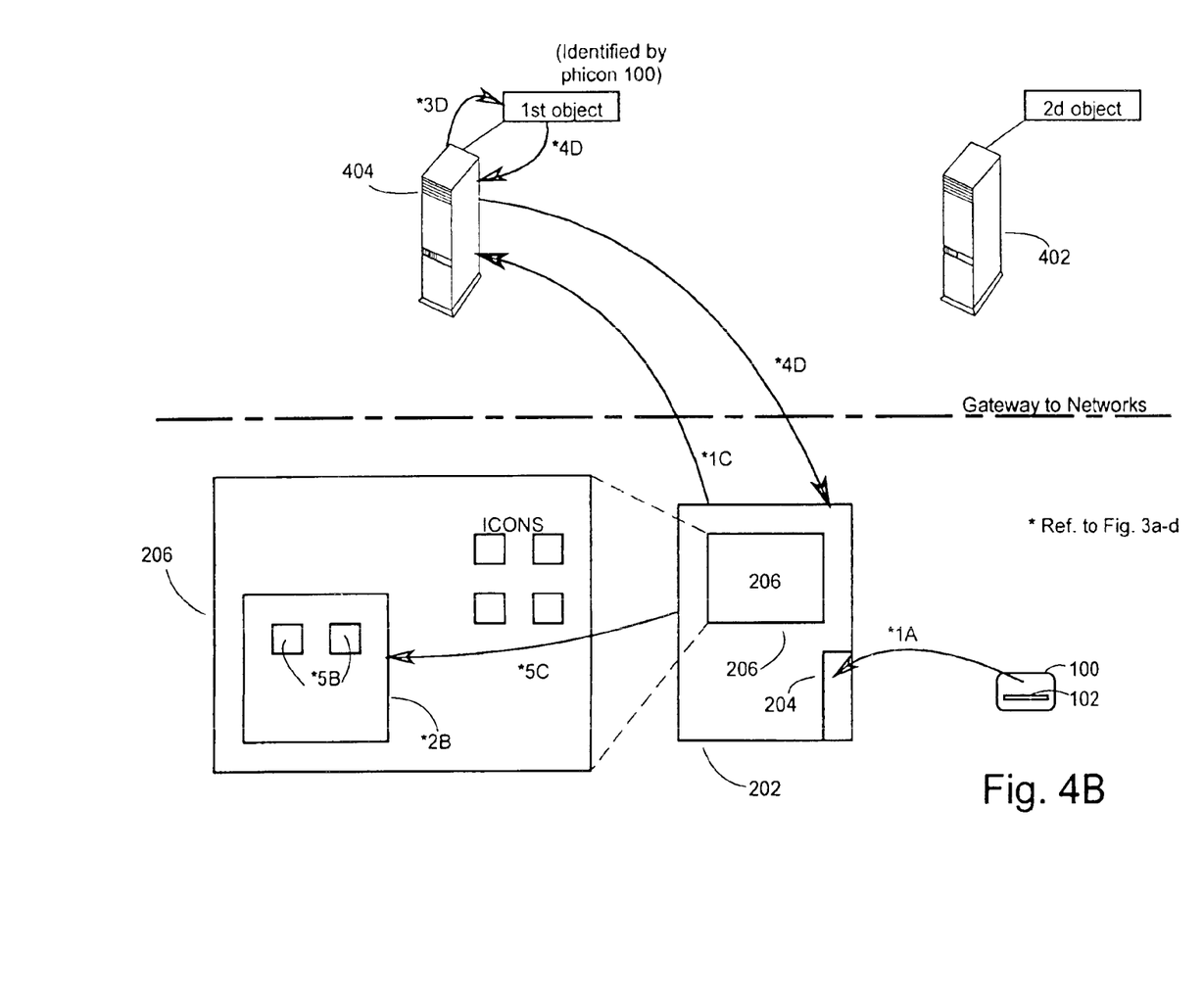

FIG. 3A depicts functions performed in the present exemplary scenario, and FIG. 4B correlates these functions with the depicted units. Each function in FIG. 3A is identified by a row-and-column identifier, and the results of the functions are shown in FIG. 4B each indexed to an identifier from FIG. 3A. Function 1A is the insertion by a user of a phicon 100 in reader 204. Only one phicon 100 is depicted in FIG. 4B, but it is only one of a number of phicons 100, each encoded with the URL of a different object. It is supposed here, as in the scenario discussed in connection with FIG. 2, that the domain portion of the URL encoded on the selected phicon 100 identifies server 402, though it should be understood that the domain portion of a phicon 100 may identify any server. Step 1C indicates that terminal 202 receives the encoded URL from reader 204 and forwards it to server 402. Step 1C also invokes step 2B, which causes display 206 to display an icon representing the phicon 100. In a preferred embodiment, the icon displayed to represent phicon 100 is a representation of a 3¼inch floppy disk.

In step 2D of FIG. 3A (not reflected in FIG. 4B), server 404 determines whether the object whose URL was coded on the selected phicon 100 is subject to restricted access. If so, server 404 determines whether the user has provided a correct password for access. If not, a message is sent to terminal 202 requesting the password. If none is provided, the scenario is terminated; the user may not access an object with the selected phicon 100.

In the present exemplary scenario, the object whose URL is encoded on the selected phicon 100 is known as the $1^{st}$ object. The $1^{st}$ object serves as a "target" object reached whenever the phicon containing its URL is presented to a phicon reader of the system, with no other action by the presenter. The $1^{st}$ object's purpose is to contain the URLs of $2^{nd}$ objects (placed there by a provider) in order that the presenter of a phicon has easy access to the $2^{nd}$ objects. In step 3D of FIG. 3A, server 404 determines whether the $1^{st}$ object already exists. (It would not necessarily exist if the selected phicon 100, uniquely identifying one object, had never been used before.) If the $1^{st}$ object does not exist, server 404 creates it.

The present exemplary scenario supposes that the $1^{st}$ object does exist, and contains two other URLs. In step 4D, those two other URLs are forwarded to terminal 202, which in turn forwards them (step 5C) to display 206, which displays them (step 5B) within the icon that represents phicon 100.

Figure 4C:
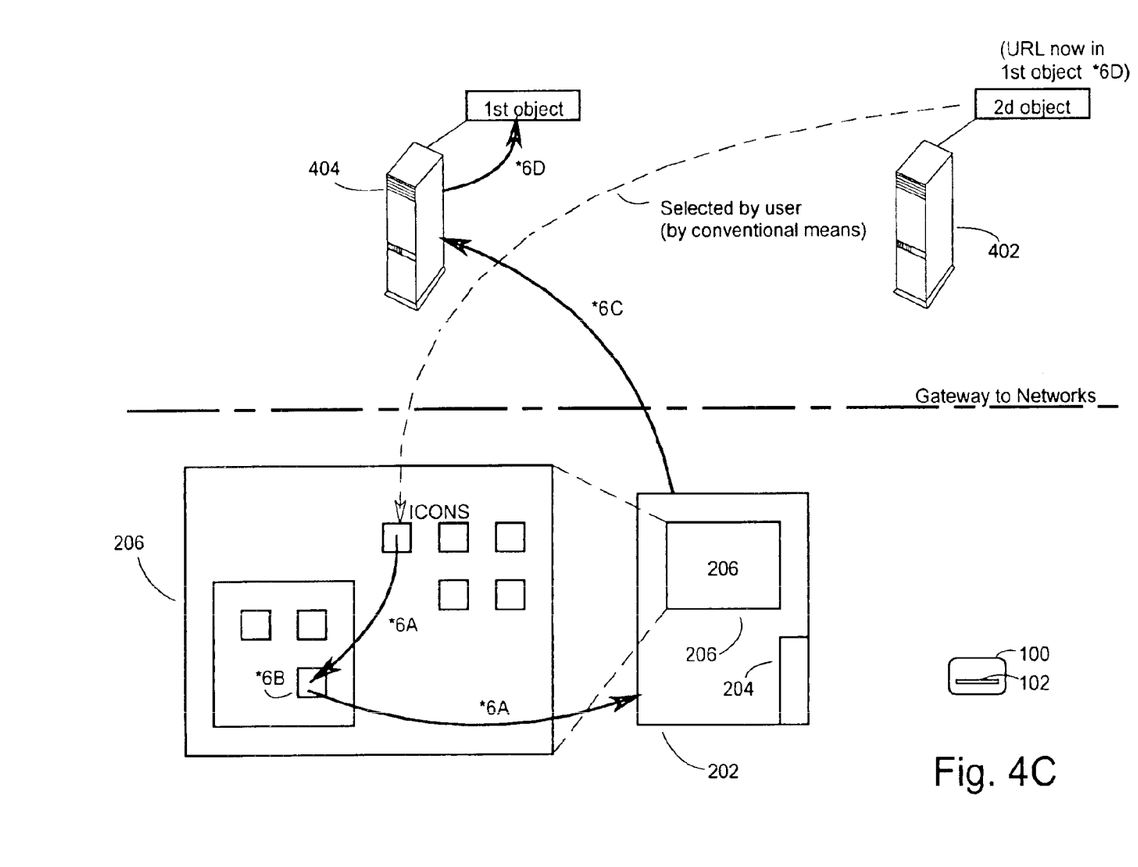

The user now has the option of manipulating the contents of the $1^{st}$ object by manipulating representations on display 206. Referring to FIGS. 3B and 4C, the present exemplary scenario supposes that the user wishes to add to the $1^{st}$ object the URL of a $2^{nd}$ object, taken in this example to be associated with the domain of server 402. The user would have selected the $2^{nd}$ object in the conventional manner, causing an iconic representation of it to appear on display 206. In step 6A, the user "drags" a copy of the $2^{nd}$ object's icon into the icon representing the selected phicon 100 and thus representing the $1^{st}$ object. Terminal 202, cognizant that step 6A has occurred, forwards the URL of the $2^{nd}$ object to server 404 (step 6C). Server 404 stores the $2^{nd}$ object's URL within the $1^{st}$ object (step 6D).

FIG. 3C (not reflected in FIGS. 4A through 4D) shows the steps that take place when a user similarly deletes an icon from within the icon representing phicon 100 and the $1^{st}$ object, resulting in deleting the corresponding URL from within the $1^{st}$ object.

Figure 4D:
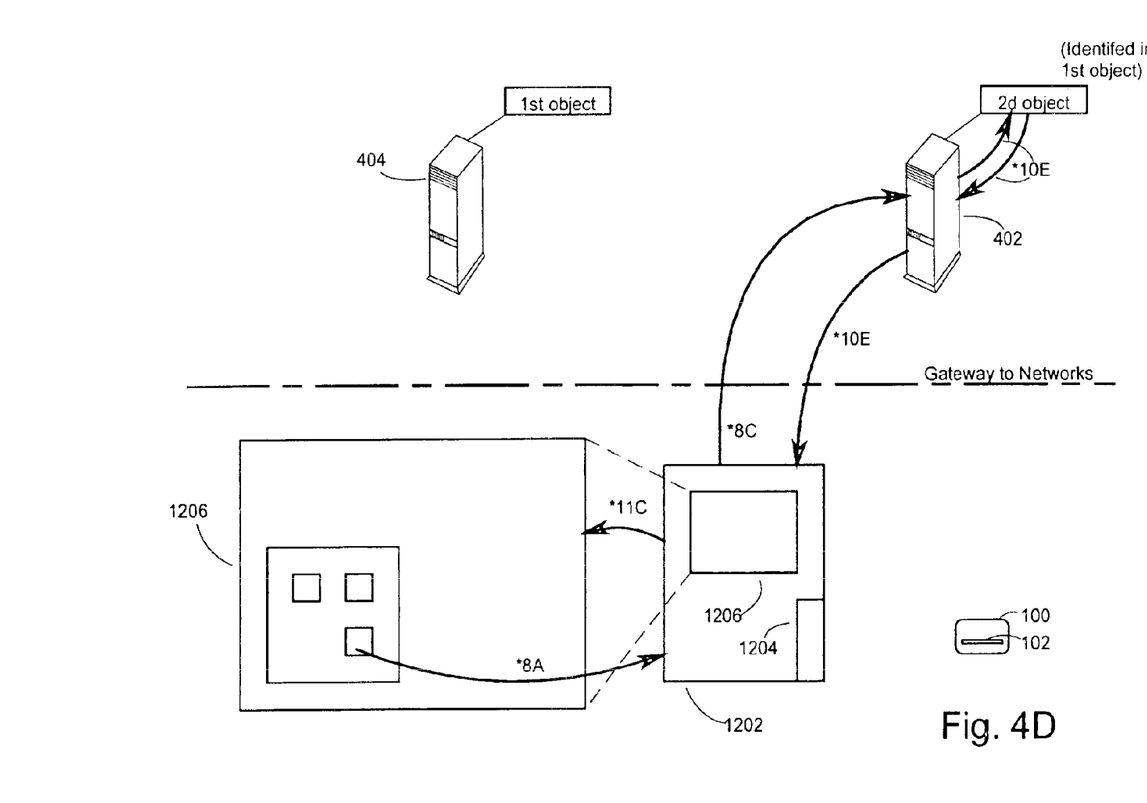

The four exemplary scenarios presented in the four FIGS. 3A through 3D may all occur in one continuous session controlled from one terminal 202, or each may occur in a different session on the same or different terminal equipment. It is supposed in the present example, as in the example discussed in connection with FIG. 2, that after a first user (the provider) has used a selected phicon 100 to select a $1^{st}$ object, and has (from terminal 202) set up that $1^{st}$ object to contain the URLs of certain $2^{nd}$ objects as discussed in connection with FIGS. 3A through 3C, the first user has passed the selected phicon 100 to a second user (the recipient). FIGS. 3D and 4D illustrate the actions occurring when the recipient user accesses the $2^{nd}$ object. The recipient user inserts the selected phicon 100 received from the provider user, and inserts it into reader 1204 of terminal 1202. By actions similar to those given in FIG. 3A, the reading of the selected phicon 100 causes an icon representing phicon 100 (and the $1^{st}$ object) to appear on display 1206. It contains icons representing $2^{nd}$ objects whose URLs have previously been stored in the $1^{st}$ object as discussed in connection with FIG. 3B, and retrieved in connection with FIG. 3A.

In step 8A of FIG. 3D, the recipient user selects one of the icons within the icon representing the selected phicon 100. The selected icon might identify the URL of any object in any domain. In the present exemplary scenario the selected icon identifies a URL of an object in the domain of server 402 and designated $2^{nd}$ object in FIG. 4D. Server 1206, cognizant of the selection made by the user, forwards the $2^{nd}$ objects URL to the server identified by the domain portion of the URL (step 8C). In some other scenario the $2^{nd}$ object might be in the domain of server 404, in which case step 8C would dispatch to step 9D; in the present exemplary scenario the $2^{nd}$ object is in the domain of server 402, so step 8C dispatches to step 9E, executed in server 402. If authorization is required to access the $2^{nd}$ object, step 9E (not reflected in FIG. 4D) verifies that the user has provided an appropriate password in manner similar to that of step 2D (FIG. 3A). If there are no access restrictions, or if the user meets the access restrictions, step 10E is reached. A copy of the $2^{nd}$ object is forwarded to terminal 1202. In steps 11C and 11B, actions are performed as directed by the second object; for example, if the $2^{nd}$ object is the spreadsheet file SS.123 as discussed in connection with FIG. 2, the spreadsheet program is run on terminal 1202 and the data specified by file SS.123 are presented to the user by the spreadsheet program. The user may interact with the spreadsheet program (step 11A) in whatever conventional means the spreadsheet program allows.

It is possible that sometime after the provider set up the $1^{st}$ object to provide access to the $2^{nd}$ object (e.g., spreadsheet file SS.123), the $2^{nd}$ object may be modified, in which case the selected phicon 100 provides the user with access to the current (modified) version of the file. It is also possible that sometime after the provider set up the $1^{st}$ object to provide access to the $2^{nd}$ object, the $2^{nd}$ object was moved (so as to be accessible through a different URL) or deleted. In this case the phicon 100 will no longer provide access to the $2^{nd}$ object.

A phicon 100 may be reused to provide access to other $2^{nd}$ objects, either in addition to or instead of $2^{nd}$ objects presently represented on it. The URL of the $1^{st}$ object stays on the selected phicon 100 and never need be rewritten. The $1^{st}$ object, though, may have any number of URLs of $2^{nd}$ objects stored in it as discussed in connection with FIG. 3B, and URLs of $2^{nd}$ objects may be deleted from the $1^{st}$ object as desired, as discussed in connection with FIG. 3C.

A phicon 100 need only carry the very small volume of data necessary to contain a URL. Even lengthy URLs rarely exceed a few hundred bytes. Yet the $1^{st}$ object may contain a large number of URLs of $2^{nd}$ objects, and the $2^{nd}$ objects may be of arbitrary size. Thus, although carrying a phicon 100 may seem to a user to be analogous in many ways to carrying a portable data storage medium, such as a floppy disk, the phicon 100 gives the user access to a virtually unlimited amount of data while a portable data storage medium has an inherent capacity limit (e.g., 1.44 megabytes for a 3¼inch floppy disk). Furthermore, information stored on a floppy disk remains static while, as noted above, objects accessed by means of a phicon 100 are the current versions of those objects.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of providing access to objects on a computer network comprising the steps of:
    initializing a phicon, said phicon comprising a machine-readable tag having a resource identifier encoded thereon, said resource identifier identifying a memory location at a provider server, said initializing step comprising the sub-steps of:
        presenting the phicon to a phicon-reading appliance;
        contacting the provider server using the resource identifier read from the phicon by the phicon-reading appliance;
        creating a network object at the memory location identified by the resource identifier;
        placing at least one pointer in the created network object, said at least one pointer identifying at least one data object, whereby the created network object can provide access to a plurality of data objects having arbitrary sizes; and
    accessing the at least one data object using said initialized phicon, said accessing step comprising the sub-steps of:
        presenting, by an accessing user, the phicon to the phicon-reading appliance;
        contacting the provider server using the resource identifier read from the phicon by the phicon-reading appliance; and
        presenting to the accessing user the at least one data object identified by the at least one pointer, whereby the accessing user may interact with the at least one data object identified by the at least one pointer.

2. The method of claim 1, wherein the step of creating the network object is performed by the provider server in response to the step of contacting the provider server using the resource identifier.

3. The method of claim 1, wherein the step of creating the network object is performed before the step of contacting the provider server using the resource identifier.

4. The method of claim 1, wherein the accessing step further comprises the sub-step of:
    providing to the accessing user means for modifying at least one of the network object and the at least one data object identified by the at least one pointer.

5. The method of claim 4, wherein the means for modifying can also change a size of the at least one data object identified by the at least one pointer.

6. The method of claim 1, wherein the accessing step further comprises the sub-step of:
    providing to the accessing user means for deleting at least one of the network object, the at least one pointer, and the at least one data object identified by the at least one pointer.

7. The method of claim 1, wherein the accessing step further comprise the sub-step of:
    providing to the accessing user means for adding at least one other pointer to the network object.

8. The method of claim 1, wherein the at least one data object comprises at least one of software, a document file, a spread sheet file, a video file, an image file, an audio file, and a hyperlink to another data object.

9. The method of claim 1, wherein the phicon-reading appliance reads the phicon using at least one of OCR characters, MICR characters, bar code, magnetic stripe, RF patch antenna, printed circuit, short-range RF transmission, and infrared transmission.

10. The method of claim 1, wherein the step of accessing the network object further comprises the sub-step of:
    resolving, using the at least one pointer, a location of the at least one data object.

11. The method of claim 10, wherein the sub-step of presenting to the accessing user the at least one data object comprises the step of:
    retrieving the at least one data object using the resolved location.

12. The method of claim 1, wherein the resource identifier comprises a network URL.

13. The method of claim 1, wherein the at least one pointer comprises a network URL.

14. The method of claim 1, wherein the sub-step of placing the at least one pointer in the network object, said at least one pointer identifying at least one data object, comprises the step of:
    moving, on a graphical user interface (GUI), an icon representing the at least one data object into, on top of, or otherwise inside an icon representing the network object, whereby the at least one pointer identifying the at least one data object is created within the network object.

15. The method of claim 1, further comprising the step of:
    re-using the phicon by deleting the at least one pointer in the network object and placing another at least one pointer in the network object.

16. The method of claim 1, wherein the initializing step further comprises the sub-step of:
    providing means for defining access criteria for accessing the at least one data object identified by the at least one pointer.

17. The method of claim 16, wherein the access criteria comprises a password.

18. The method of claim 1, wherein the accessing step further comprises the sub-steps of:

determining whether the at least one data object identified by the at least one pointer is subject to restricted access;

if the at least one data object is subject to restricted access, determining whether the user has entered a correct password for restricted access before providing access to the at least one data object.

19. The method of claim 1, wherein an initializing user performs the initializing step and the accessing user performs the accessing step, and wherein, before the accessing step, the method further comprises the step of:

transferring possession of the phicon from the initializing user to the accessing user.

20. The method of claim 19, wherein the at least one data object is associated with one of an issue of a printed publication, demographic information related to distribution channels of copies of a printed publication, and an intended recipient of a copy of a printed publication; wherein the accessing user is a recipient of a copy of the printed publication; and wherein possession of the phicon is transferred to the accessing user by inserting the phicon into the copy of the printed publication.

21. The method of claim 1, wherein the accessing step further comprises the sub-step of:

presenting to the accessing user the network object.

22. The method of claim 1, wherein the accessing step further comprises the sub-step of:

presenting to the accessing user the at least one pointer.

* * * * *